(12) United States Patent
Han et al.

(10) Patent No.: US 8,899,770 B2
(45) Date of Patent: Dec. 2, 2014

(54) LUMINANCE ENHANCEMENT FILM AND BACKLIGHT UNIT INCLUDING THE SAME

(75) Inventors: A Reum Han, Seoul (KR); Dae Shik Kim, Yongin-si (KR); Deug Soo Ryu, Yongin-si (KR); Jeong Yeol Moon, Yongin-si (KR)

(73) Assignee: Kolon Industries, Inc., Gwacheon-si (KR)

( * ) Notice: Subject to any disclaimer, the term of this patent is extended or adjusted under 35 U.S.C. 154(b) by 175 days.

(21) Appl. No.: 13/578,662

(22) PCT Filed: Dec. 29, 2011

(86) PCT No.: PCT/KR2011/010298
§ 371 (c)(1),
(2), (4) Date: Aug. 13, 2012

(87) PCT Pub. No.: WO2012/091481
PCT Pub. Date: Jul. 5, 2012

(65) Prior Publication Data
US 2012/0314401 A1    Dec. 13, 2012

(30) Foreign Application Priority Data

Dec. 31, 2010 (KR) .................. 10-2010-0140832
Dec. 27, 2011 (KR) .................. 10-2011-0143812

(51) Int. Cl.
*G09F 13/04* (2006.01)
*G02B 1/04* (2006.01)
*G02B 5/02* (2006.01)
*G02B 5/30* (2006.01)

(52) U.S. Cl.
CPC ................ *G02B 1/04* (2013.01); *G02B 5/0242* (2013.01); *G02B 5/3083* (2013.01)
USPC ........... 362/97.1; 362/558; 362/618; 362/624

(58) Field of Classification Search
USPC ................. 362/617, 618, 622, 623, 624, 627; 428/1.3, 220; 252/589; 359/483.01
See application file for complete search history.

(56) References Cited

U.S. PATENT DOCUMENTS

| 8,072,683 | B2 * | 12/2011 | Tan et al. ................. 359/489.16 |
| 2006/0131522 | A1 * | 6/2006 | Choi et al. ................ 250/559.36 |
| 2008/0049184 | A1 * | 2/2008 | Tan et al. ...................... 349/191 |
| 2008/0107832 | A1 * | 5/2008 | Takeda .......................... 428/1.4 |

FOREIGN PATENT DOCUMENTS

JP    2009-109995 A    5/2009

* cited by examiner

*Primary Examiner* — Ali Alavi
(74) *Attorney, Agent, or Firm* — Sughrue Mion, PLLC

(57) ABSTRACT

Disclosed is a luminance enhancement film which is suitable for use in a display and includes a multilayered thin film and a uniaxially drawn film formed on one surface of the multilayered thin film.

20 Claims, 1 Drawing Sheet

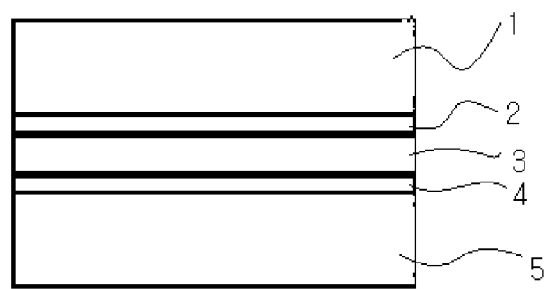

LUMINANCE ENHANCEMENT FILM AND BACKLIGHT UNIT INCLUDING THE SAME

CROSS REFERENCE TO RELATED APPLICATION

This application is a National Stage of International Application No. PCT/KR2011/010298, filed on Dec. 29, 2011, which claims priority from Korean Patent Application Nos. 10-2010-0140832, filed on Dec. 31, 2010 and 10-2011-0143812, filed Dec. 27, 2011, the contents of all of which are incorporated herein by reference in their entirety.

TECHNICAL FIELD

The present invention relates to a luminance enhancement film and a backlight unit including the same, suitable for use in displays.

BACKGROUND ART

Generally, a backlight unit of a liquid crystal display includes a reflective film, a diffusion film, a prism film, etc., in order to achieve high luminance and optical uniformity. Also, a luminance enhancement film is used, which may include a light diffusion film which randomly emits polarized light at a wider angle. As part of such a composite film, an attempt has been made to stack a film which may enhance luminance, for example, a reflective polarization film, and a film which may diffuse light, for example, a light diffusion film (Korean Unexamined Patent Application Publication No. 10-2006-055341).

Typically a light diffusion film is formed by coating a biaxially drawn polyethyleneterephthalate film useful as a base layer with a light diffusion layer. However, the light diffusion film having the above configuration may cause non-polarization or inverse scattering of polarized light, undesirably lowering the overall optical properties.

DISCLOSURE

Technical Problem

Accordingly, the present invention has been made keeping in mind the above problems occurring in the related art, and the present invention is intended to provide a luminance enhancement film which may minimize the non-polarization or inverse scattering of polarized light, and a backlight unit including the same.

Technical Solution

In accordance with a first embodiment, a luminance enhancement film is provided, which includes a multilayered thin film including a plurality of first thin films which are optically isotropic and a plurality of second thin films which are optically anisotropic and having a reflective axis which reflects incident light and a transmissive axis which transmits the light; and a uniaxially drawn film formed on at least one surface of the multilayered thin film.

In accordance with a second embodiment, a backlight unit including the luminance enhancement film is provided.

DESCRIPTION OF DRAWING

FIG. 1 schematically illustrates the cross-section of a luminance enhancement film according to an embodiment of the present invention.

MODE FOR INVENTION

Hereinafter, a detailed description will be given of the present invention.

According to an embodiment of the present invention, a luminance enhancement film includes a multilayered thin film including a plurality of first thin films which are optically isotropic and a plurality of second thin films which are optically anisotropic and having a reflective axis for reflecting incident light and a transmissive axis for transmitting the light; and a uniaxially drawn film formed on at least one surface of the multilayered thin film. The luminance enhancement film may further include a light diffusion layer formed on the uniaxially drawn film. Another embodiment of the invention provides a luminance enhancement film which is configured such that a uniaxially drawn film is formed on one surface of the multilayered thin film and an anti-blocking layer is formed on the other surface thereof to impart slipping to an optical member positioned thereunder.

The luminance enhancement film may reduce non-polarization or inverse scattering of light by adjusting the angle formed by the reflective axis of the multilayered thin film and the optical axis of the uniaxially drawn film when the uniaxially drawn film is formed on the multilayered thin film. Preferably the angle which is formed by the reflective axis of the multilayered thin film and the optical axis of the diffusion film is 40° or less, more preferably 20° or less, and much more preferably 0°. In particular, non-polarization or inverse scattering may be minimized at 0°, thus increasing the luminance.

The luminance enhancement film may include first and second thin films. The first thin films and/or the second thin films may include organic and/or inorganic materials. However, in consideration of film processability, flexibility, manufacturing cost, etc., organic materials may be used.

For example, the first thin films may be optically anisotropic, and the second thin films may be optically isotropic. As used herein, the term "optically isotropic" means that the refractive indexes related to all the axes in the plane of the thin film are substantially the same, and the term "optically anisotropic" means that the refractive indexes related to the axes in the plane of the thin film are substantially different.

An example of a polymer which forms the first thin films which are optically anisotropic includes a resin in which the amount of an ethylene naphthalate repeating unit is 80 mol % or more, 85 mol % or more, 90 mol % or more, 95 mol % or more, or 98 mol % or more. Alternatively, the first thin films may include a resin in which the amount of the ethylene naphthalate repeating unit is 100 mol %, and at least two of these resins may be used.

The first thin films may include a resin having 80~100 mol % of an ethylene naphthalate repeating unit and 0~20 mol % of an ethylene terephthalate repeating unit. Preferably, the first thin films include a resin having 90~100 mol % of the ethylene naphthalate repeating unit and 0~10 mol % of the ethylene terephthalate repeating unit.

The resin of the first thin films may be prepared by polycondensing dimethylcarboxylic naphthalate (NDC) and ethylene glycol (EG), or by polycondensing dimethylcarboxylic naphthalate (NDC), ethylene glycol (EG) and terephthalic acid (TPA).

The second thin films may include at least one polymer selected from the group consisting of a copolymer of alkylene naphthalene and alkylene terephthalate and an alloy of alkylene terephthalate and polycarbonate.

The second thin films may include a resin having 10~60 mol % of an ethylene naphthalate repeating unit, preferably a resin having 10~60 mol % of an ethylene naphthalate repeating unit and 40~90 mol % of an ethylene terephthalate repeating unit. More preferably useful is a resin having 40~60 mol % of an ethylene naphthalate repeating unit and 40~60 mol % of an ethylene terephthalate repeating unit.

The resin of the second thin films may be prepared by polycondensing dimethylcarboxylic naphthalate (NDC), ethylene glycol (EG) and terephthalic acid (TPA).

At least one of the first and second thin films, preferably all of the first and second thin films may include a polymer resin having an intrinsic viscosity of 0.5 dL/g or less. If the intrinsic viscosity of the polymer resin exceeds the above value, rheological defects may occur in the polymer fluid in the drawing process. Furthermore, the drawing ratio may be restricted and it is difficult to manufacture a multilayered thin film having a high drawing rate at low temperature.

The multilayered thin film may be provided in the form of a stack of repeating units each including a first thin film and a second thin film, namely, an alternately multilayered thin film, but the present invention is not limited thereto. For example, the repeating unit may be formed by disposing at least one thin film different from the first and second thin films at any position of the repeating unit. Alternatively, a repeating unit including the first thin film and the second thin film, and at least one repeating unit having the stacking form different from the above repeating unit may be regularly or irregularly stacked.

The multilayered thin film has the reflective axis and the transmissive axis which are orthogonal to each other in the plane of the film due to the first and second thin films, and reflects polarized light along the reflective axis among the light incident on the luminance enhancement film and may let polarized light pass through along the transmissive axis among the light incident on the luminance enhancement film. This light may be UV light, visible light, infrared light, etc. For example, in the case where the luminance enhancement film is applied to a display, the light may be visible light.

In order to impart the luminance enhancement film with selective transparency and reflectivity with respect to light of a specific wavelength, the first and second thin films each have an optical thickness defined by multiplying the refractive index by the thickness, and the optical thickness may be constant or may vary. For example, the first and second thin films each have an optical thickness of 0.05~0.60 μm, preferably 0.09~0.45 μm, and more preferably 1.0~0.40 μm.

A difference in refractive index between the first and second thin films along the reflective axis may be at least 0.05. A difference in refractive index between the first and second thin films along the transmissive axis may be 0.03 or less. The luminance enhancement film includes a normal axis perpendicular to the plane of the film, and a difference in refractive index between the first and second thin films along the normal axis may be 0.03 or less. As such, if the difference in refractive index between the first and second thin films along the reflective axis is less than 0.05, light reflected from the interface between the first and second thin films may decrease, and thus luminance enhancing effects may become insignificant. Also, if the difference in refractive index between the first and second thin films along the transmissive axis exceeds 0.03 or the difference in refractive index between the first and second thin films along the normal axis exceeds 0.03, light reflected from the adjacent surface may increase, undesirably suppressing an increase in luminance. The difference in refractive index along the above three axes may be obtained using a material which causes birefringence due to drawing, and a material which does not generate birefringence or in which the generation thereof is insignificant. As such, the drawing axis may be the reflective axis.

In the case where the first and second thin films each include a polymer resin, the difference between the glass transition temperature of the first polymer resin and the glass transition temperature of the second polymer resin may be 30° C. or less. If the difference in the glass transmission temperature exceeds 30° C., the difference in melting viscosity of the co-extruded resin may increase, making it difficult to uniformly adjust the thickness of each layer and to form the layer.

In the luminance enhancement film including the first thin films and the second thin films disposed on the first thin films, the component of the first thin films, the difference in refractive index between the first and second thin films, the difference in glass transition temperature, etc., are precisely adjusted, making it possible to manufacture a backlight unit having uniform luminance distribution.

The uniaxially drawn film may block or reduce the non-polarization or inverse scattering of polarized light. The uniaxially drawn film may be selected from among a polyethyleneterephthalate (PET) film, a polycarbonate film, a polyethylene film, a polystyrene film, and a polyepoxy film.

The in-plane refractive index difference ($\Delta n=|n_x-n_y|$) of the uniaxially drawn film is 0.03 or more, preferably 0.05 or more, more preferably 0.5 or more, much more preferably 1.0 or more, and most preferably 1.5 or more. The case where the refractive index difference ($\Delta n=|n_x-n_y|$) is less than 0.03 may cause problems of non-polarization or inverse scattering of light, undesirably decreasing luminance. As such, nx is the refractive index in the drawing direction of the uniaxially drawn film, and ny is the refractive index in a direction perpendicular to the drawing direction. The refractive index of the uniaxially drawn film may fall in the range of 1.0~1.65.

The drawing direction of the uniaxially drawn film may be the MD (Machine Direction) or the TD (Transverse Direction).

In the case where the light diffusion layer is provided on the uniaxially drawn film, the uniaxially drawn film may be used as a base layer for forming the light diffusion layer. In this case, the uniaxially drawn film and the light diffusion layer may constitute the light diffusion film.

The light diffusion layer may include a binder resin and light diffusing particles.

The binder resin is not particularly limited, and examples thereof include thermosetting or UV curable resins, such as polyvinyl-, acryl-, polyester-, styrene-, alkyd-, amino-, polyurethane-, epoxy-based resins, etc., which may be used alone or in mixtures of two or more.

The light diffusing particles included in the light diffusion layer may include organic or inorganic particles. Examples of the inorganic particles include silica, zirconia, calcium carbonate, barium sulfate, titanium oxide, etc., and examples of the organic particles include homopolymers or copolymers obtained from monomers such as styrene, melamine formaldehyde, benzoguanamine formaldehyde, benzoguanamine melamine formaldehyde, propylene, ethylene, silicon, urethane, methyl(meth)acrylate, etc., which may be monodispersed or polydispersed, but the present invention is not limited thereto.

The amount of the light diffusing particles may be 20~200 parts by weight based on 100 parts by weight of the binder resin. If the amount of the light diffusing particles is less than 20 parts by weight, the diffusion function may deteriorate, undesirably decreasing luminance in the up-down viewing angle range of 50~60° based on the front surface which is set to 0°. In contrast, if the amount thereof exceeds 200 parts by weight, the haze of the film may increase and the particles may be separated due to external impact, undesirably decreasing the total luminance.

On the other hand, when the light diffusion layer includes light diffusing particles having different particle sizes, appropriate hiding properties may exhibit and luminance may increase. Thus, the light diffusion layer may include at least one type of particles selected from among first light diffusing particles having an average particle size of 1~20 μm and second light diffusing particles having an average particle size of 20~40 μm.

When light diffusing particles the refractive indexes of which are different as well as the particle sizes are used, hiding properties and luminance may be further improved. For example, the light diffusing particles include first light diffusing particles having an average particle size of 1~20 μm and a refractive index of n1 and second light diffusing particles having an average particle size of 20~40 μm and a refractive index of n2. The case where n1 and n2 are different may satisfy |n1−n2|>0.02, whereas the case where the refractive index difference is not satisfied results in slightly deteriorated diffusion function and lowered hiding properties, and thus moiré hiding is not achieved upon multilayer extrusion, undesirably causing defects.

Preferably the light diffusion layer includes first light diffusing particles and second light diffusing particles at a mixing ratio of 10:90~90:10. If the mixing ratio falls outside the above range, the total haze of the film may increase because pores between large particles are filled with small particles, undesirably resulting in lowered luminance.

The ratio of the thickness of the light diffusion layer relative to the thickness of the multilayered thin film may be 0.05~0.5. If the thickness ratio is less than 0.05, light diffusion effects may become insignificant. In contrast, if the thickness ratio exceeds 0.5, hiding power may be expected but luminance may decrease.

The haze of the light diffusion layer is 30~100%, preferably 35~100%, and more preferably 40~100%. If the haze is less than 30%, light diffusion effects may become insignificant.

The anti-blocking layer prevents the luminance enhancement film from adhering to another member disposed on one surface of the luminance enhancement film and minimizes frictional force thus preventing quality defects such as moiré, etc. Furthermore, the anti-blocking layer may prevent electrification.

The anti-blocking layer includes a binder resin and 0.1~100 parts by weight of beads based on 100 parts by weight of the binder resin. The binder resin may include examples of the resin listed for the binder resin of the light diffusion layer, and the beads may include beads made of materials listed for the light diffusing particles of the light diffusion layer.

The anti-blocking layer is formed on a transparent resin film and may be formed on the luminance enhancement film using an adhesive layer. The haze of the anti-blocking layer may be 1~30%. If the haze exceeds 30%, hiding power may be expected but luminance may decrease.

The luminance enhancement film obtained by stacking the light diffusion film and the multilayered thin film may occasionally decrease luminance depending on the temperature and the usage time, which was found to be caused by interfacial separation of the multilayered thin film and the light diffusion film, which are stacked.

In an embodiment of the present invention, it can be found that, in the case where surface hydrophilicity of the multilayered thin film is increased, even when the light diffusion film is stacked using an adhesive, a sufficient interlayer adhesive force may be ensured. Accordingly, the surface contact angle of the multilayered thin film is 50~85°, and preferably 70~85°.

The luminance enhancement film may be used to increase the luminance of the backlight unit which is installed as an external light source of a liquid crystal display which has no self-light emitting source. In order to satisfy a variety of forms, end uses, etc., of the liquid crystal display, the properties of the luminance enhancement film required of the liquid crystal display have to be further improved. For example, to ensure reliability of the liquid crystal display under various external conditions, the luminance enhancement film has to minimize the luminance decrement so as to maintain the luminance even when external conditions vary. The luminance enhancement film in which the surface hydrophilicity of the multilayered thin film is increased may satisfy such requirements.

The surface hydrophilicity of the multilayered thin film may be increased via physical and chemical treatment of surface properties. Upon physical treatment, hydrophilicity may be imparted at the same time of extrusion but there are changes in surface properties over time and satisfactory hydrophilicity makes it difficult to obtain. Upon chemical modification, primer coating may be applied after extrusion, but it is difficult to match the refractive indexes of the resins of the multilayered thin film, undesirably causing luminance to decrease. In the present invention, the resin for first and/or second thin films of the multilayered thin film preferably includes a resin which is not subjected to solid polymerization. When the multilayered thin film is manufactured using the polymer resin which is not subjected to solid polymerization, hydrophilicity of the surface of the multilayered thin film may increase. This is considered to be because the hydroxyl group is left behind on the terminal of the polymer resin. When the hydrophilicity of the multilayered thin film is increased in this way, adhesive force between the multilayered thin film and the adhesive layer, between the adhesive layer and the light diffusion film, or between the multilayered thin film and the light diffusion layer may be enhanced.

The following examples which are set forth to illustrate but are not to be construed as limiting the present invention may provide a better understanding of the present invention.

EXAMPLE 1

Dimethylcarboxylic naphthalate (NDC) and ethylene glycol (EG) were polycondensed in a polymerization reactor, thus preparing a first polymer resin having 100 mol % of an ethylene naphthalate repeating unit. Dimethylcarboxylic naphthalate (NDC), ethylene glycol (EG), terephthalic acid (TPA) were polycondensed thus preparing a second polymer resin having 40 mol % of an ethylene naphthalate repeating unit and 60 mol % of an ethylene terephthalate repeating unit. The polymerization of the first polymer resin and the second polymer resin was completed without performing solid polymerization. In order to dewater the resultant polymer resins, the first polymer resin was dried in an oven at 100° C. for 24 hr and the second polymer resin was dried at 70° C. for 48 hr. The first polymer resin and the second polymer resin were respectively extruded at a rate of 30 kg/hr using a multilayer feed block having 256 layers, resulting in the final manufacture of a multilayered extrusion sheet having 1,024 layers. The multilayered extrusion sheet was uniaxially drawn at a drawing ratio of 5 times at 130° C.

Both surfaces of the multilayered thin film drawn as above were coated with an acrylic UV curable adhesive, after which a light diffusion film (haze 95%) including a uniaxially drawn film and a light diffusion layer was stacked on the upper surface of the multilayered thin film. The uniaxially drawn film was a uniaxially drawn PET film, and the light diffusion layer was formed of 135 parts by weight of polymethylmethacrylate particles based on 100 parts by weight of a urethane acrylate binder resin. As such, the angle formed by the reflective axis of the multilayered thin film and the optical axis of the uniaxially drawn film was set to 0°.

Subsequently, provided on the lower surface of the drawn multilayered thin film was an anti-blocking layer containing 15 parts by weight of polymethylmethacrylate particles having a size of 5 μm based on 100 parts by weight of the urethane acrylate binder resin to obtain a haze of 5%, ultimately manufacturing a luminance enhancement film.

EXAMPLES 2~5

Respective luminance enhancement films were manufactured in the same manner as in Example 1, with the exception that the angle formed by the reflective axis of the multilayered thin film and the optical axis of the uniaxially drawn film was set as shown in Table 1 below.

EXAMPLES 6~8

Respective luminance enhancement films were manufactured in the same manner as in Example 1, with the exception of the changes made to the haze of the light diffusion layer which are shown in Table 1 below.

COMPARATIVE EXAMPLE 1

A luminance enhancement film was manufactured in the same manner as in Example 1, with the exception that a light diffusion film including a biaxially drawn film and a light diffusion layer was formed on the upper surface of the multilayered thin film.

REFERENCE EXAMPLE 1

A luminance enhancement film was manufactured in the same manner as in Example 1, with the exception that the angle formed by the reflective axis of the multilayered thin film and the optical axis of the diffusion film was set to 50°.

REFERENCE EXAMPLE 2

Dimethylcarboxylic naphthalate (NDC) and ethylene glycol (EG) were polycondensed in a polymerization reactor, thus preparing a first polymer resin having 100 mol % of an ethylene naphthalate repeating unit. Dimethylcarboxylic naphthalate (NDC), ethylene glycol (EG), terephthalic acid (TPA) were polycondensed thus preparing a second polymer resin having 40 mol % of an ethylene naphthalate repeating unit and 60 mol % of an ethylene terephthalate repeating unit. The first polymer resin and the second polymer resin were subjected to solid polymerization and the polymerization thereof was completed. In order to dewater the resultant polymer resins, the first polymer resin was dried in an oven at 100° C. for 24 hr and the second polymer resin was dried at 70° C. for 48 hr. The first polymer resin and the second polymer resin were respectively extruded at a rate of 30 kg/hr using a multilayer feed block having 256 layers, finally manufacturing a multilayered extrusion sheet having 1,024 layers. The multilayered extrusion sheet was uniaxially drawn at a drawing ratio of 5 times at 130° C.

Both surfaces of the drawn multilayered thin film were coated with an acrylic UV curable adhesive, after which a light diffusion film (haze 95%) including a uniaxially drawn film and a light diffusion layer was stacked on the upper surface of the multilayered thin film. The uniaxially drawn film was a uniaxially drawn PET film, and the light diffusion layer was formed of 135 parts by weight of polymethylmethacrylate particles based on 100 parts by weight of a urethane acrylate binder resin. As such, the angle formed by the reflective axis of the multilayered thin film and the optical axis of the uniaxially drawn film was set to 0°.

Subsequently, provided on the lower surface of the drawn multilayered thin film was an anti-blocking layer containing 15 parts by weight of polymethylmethacrylate particles having a size of 5 μm based on 100 parts by weight of the urethane acrylate binder resin to obtain a haze of 5%, ultimately manufacturing a luminance enhancement film.

Measurement of Physical Properties

The haze and the luminance increment of the luminance enhancement films manufactured in the examples and comparative examples were measured. The results are shown in Table 1 below.

(1) Haze

Haze was measured using a haze meter (NDH 200, available from NIPPON DENSHOKU).

(2) Luminance

As optical films, a diffusion film (XC210, available from KOLON) and a prism film (LC217, available from KOLON) were provided on a 22-inch backlight unit, after which the luminance enhancement film and a 22-inch LCD panel were sequentially placed thereon, followed by applying power of 12 V thereto and then measuring the luminance using a luminance meter (BM-7, available from TOPCON, Japan).

(3) Luminance Increment

The luminance measured as above was substituted into the following equation.

Luminance increment=(luminance upon using luminance enhancement film)/(luminance upon using no luminance enhancement film)

(4) Surface Contact Angle of Multilayered Thin Film

A 50 mm×50 mm sized sample was fixed on a plate and one drop of deionized (DI) water was dropped thereon and the contact angle was then measured using a drop shape analyzer (DSA100). This measurement was repeated at least 10 times and the measured values were averaged, and the contact angle was measured at nine different points on each sample and averaged.

(5) Adhesion

The luminance enhancement film was cut to a size of 25 mm×150 mm and heated in a water bath boiled at 100° C. for 1 hr and dried, after which the diffusion film and the multilayered film each were mounted to a jig and then peeled off at 180° at a rate of 300 mm/min, and a load applied upon such peeling was measured.

TABLE 1

|  | Uniaxial Drawing of Light Diffusion Film | Angle (°) formed by Multilayered Thin film and Light Diffusion Film | Haze (%) of Light Diffusion Layer | Luminance Increment | Adhesion (kg/25 mm) | Surface Contact Angle (°) of Multilayered Thin Film |
|---|---|---|---|---|---|---|
| Ex. 1 | ○ | 0 | 95 | 1.22 | 1.5 | 70 |
| Ex. 2 | ○ | 10 | 95 | 1.18 | 1.5 | 70 |
| Ex. 3 | ○ | 20 | 95 | 1.10 | 1.5 | 70 |
| Ex. 4 | ○ | 30 | 95 | 0.95 | 1.5 | 70 |
| Ex. 5 | ○ | 40 | 95 | 0.88 | 1.5 | 70 |
| Ex. 6 | ○ | 0 | 80 | 1.25 | 1.5 | 70 |
| Ex. 7 | ○ | 0 | 60 | 1.30 | 1.5 | 70 |
| Ex. 8 | ○ | 0 | 35 | 1.42 | 1.5 | 70 |
| Comp. Ex. 1 | X | — | 95 | 0.80 | 1.5 | 70 |
| Ref. Ex. 1 | ○ | 50 | 95 | 0.84 | 1.5 | 70 |
| Ref. Ex. 2 | ○ | 0 | 95 | 1.22 | 0.5 | 90 |

As is apparent from Table 1 showing the results of evaluation of the physical properties, the luminance enhancement films of the examples in which the angle formed by the refractive axis of the multilayered thin film and the optical axis of the diffusion film was 40° or less had a high luminance increment.

As the hydrophilicity of the multilayered thin film increased, even when the light diffusion film was stacked, superior results could be obtained.

Although the preferred embodiments of the present invention have been disclosed for illustrative purposes, those having ordinary knowledge in the art will appreciate that various modifications, additions and substitutions are possible, without departing from the scope and spirit of the invention.

Therefore, the aforementioned embodiments are provided to inform those having ordinary knowledge in the art of the scope of the present invention, and thus are merely illustrative but are not to be construed as limiting the invention, and the present invention is defined by the scope of the claims.

The invention claimed is:

1. A luminance enhancement film, comprising:
a multilayered thin film including a plurality of first thin films which are optically isotropic and a plurality of second thin films which are optically anisotropic, and having a reflective axis which reflects incident light and a transmissive axis which transmits the light;
a uniaxially drawn film disposed on at least one surface of the multilayered thin film; and
an adhesive layer disposed between the uniaxially drawn film and the multilayered thin film.

2. The luminance enhancement film of claim 1, further comprising an anti-blocking layer which is disposed on other surface of the multilayered thin film where no uniaxially drawn film is disposed.

3. The luminance enhancement film of claim 2, wherein a haze of the anti-blocking layer is 1-30%.

4. The luminance enhancement film of claim 1, further comprising a light diffusion layer formed on the uniaxially drawn film.

5. The luminance enhancement film of claim 4, wherein the light diffusion layer comprises a binder resin; and 20-200 parts by weight of light diffusing particles based on 100 parts by weight of the binder resin.

6. The luminance enhancement film of claim 5, wherein the light diffusing particles include at least one type of particles selected from the group consisting of first light diffusing particles having an average particle size of 1-20 μm and second light diffusing particles having an average particle size of 20-40 μm.

7. The luminance enhancement film of claim 6, wherein the light diffusing particles include the first light diffusing particles and the second light diffusing particles at a mixing ratio of 10:90-90:10.

8. The luminance enhancement film of claim 5, wherein the light diffusing particles include first light diffusing particles having an average particle size of 1-20 μm and a refractive index of n1 and second light diffusing particles having an average particle size of 20-40 μm and a refractive index of n2, with a condition that |n1−n2|>0.02.

9. The luminance enhancement film of claim 4, wherein a thickness of the light diffusion layer is 0.05-0.5 times a thickness of the multilayered thin film.

10. The luminance enhancement film of claim 4, wherein a haze of the light diffusion layer is 30-100%.

11. The luminance enhancement film of claim 1, wherein the uniaxially drawn film is selected from the group consisting of a polyethyleneterephthalate film, a polycarbonate film, a polyethylene film, a polystyrene film and a polyepoxy film.

12. The luminance enhancement film of claim 1, wherein an in-plane refractive index difference ($\Delta n=|nx-ny|$) of the uniaxially drawn film is 0.03 or more, in which nx is a refractive index in a drawing direction of the uniaxially drawn film and ny is a refractive index in a direction perpendicular to the drawing direction.

13. The luminance enhancement film of claim 1, wherein a refractive index of the uniaxially drawn film is 1.0-1.65.

14. The luminance enhancement film of claim 1, wherein an angle formed by the optical axis of the uniaxially drawn film and the reflective axis of the multilayered thin film is 40° or less.

15. The luminance enhancement film of claim 1, wherein an angle formed by the optical axis of the uniaxially drawn film and the reflective axis of the multilayered thin film is 0°.

16. The luminance enhancement film of claim 1, wherein a drawing direction of the uniaxially drawn film is a machine direction.

17. The luminance enhancement film of claim 1, wherein a drawing direction of the uniaxially drawn film is a transverse direction.

18. A backlight unit including the luminance enhancement film of claim 1.

19. The luminance enhancement film of claim 1, wherein a surface contact angle of the multilayered thin film is 50-85°.

20. The luminance enhancement film of claim 1, wherein a resin for the first thin films or the second thin films of the multilayered thin film includes a polymer resin which is not subjected to solid polymerization.

\* \* \* \* \*